United States Patent [19]

Benton

[11] 4,217,405
[45] Aug. 12, 1980

[54] PRODUCTION OF VOLUME DIELECTRIC HOLOGRAMS

[75] Inventor: Stephen A. Benton, Somerville, Mass.

[73] Assignee: Polaroid Corporation, Cambridge, Mass.

[21] Appl. No.: 622,440

[22] Filed: Oct. 14, 1975

[51] Int. Cl.$^2$ .................. G03C 5/04; G03C 5/32; G03C 5/38
[52] U.S. Cl. ...................... 430/2; 350/3.61; 430/1; 430/414; 430/419; 430/428
[58] Field of Search ............ 96/60 R, 27 H, 63, 61 R, 96/61 M; 350/3.61, 3.5

[56] References Cited

U.S. PATENT DOCUMENTS

| | | | |
|---|---|---|---|
| 3,642,472 | 1/1972 | Mayo | 96/60 R |
| 3,775,111 | 11/1973 | Norman | 96/60 R |

OTHER PUBLICATIONS

L. P. Clere, "Monochrome Processing", *Photography Theory & Practice*, New York, N. Y., 1971, pp. 488 & 456.
Graube, "Advances in Bleaching Methods . . . Holograms", *Applied Optics*, vol. 13, No. 12, Dec. 1974, pp. 2942-2946.
Upatneeks et al., "Diffraction Efficiency of Bleached . . . Patterns," *Applied Optics*, vol. 8, No. 1, 1/1969, pp. 85-89.
Latta, John N., "The Bleaching of Holographic . . . Efficiency", *Applied Optics*, vol. 7, No. 12, Dec. 1968, pp. 2409-2416.

*Primary Examiner*—Richard L. Schilling
*Attorney, Agent, or Firm*—Stanley H. Mervis

[57] ABSTRACT

Volume dielectric holograms are prepared by methods which have in common the intra-emulsion diffusion transfer of silver atoms within the emulsion by a process of dissolving undeveloped silver halide, and diffusing and precipitating said dissolved silver on precipitation sites provided by the development of the exposed silver halide. The resulting metallic silver is then rehalogenated to substantially reconstitute the original silver halide volume of the emulsion.

7 Claims, No Drawings

PRODUCTION OF VOLUME DIELECTRIC HOLOGRAMS

This invention relates to photography and, more particularly, to photographic processes for forming holograms.

Holography, which relates to the wavefront reconstruction process by which unusually realistic three-dimensional images are reconstructed from holograms, has been extensively described and discussed since its discovery by Dennis Gabor in 1947. For a number of reasons holograms made from silver halide photographic materials have been particularly desired, and considerable research in the use of silver halide holographic recording has been reported. Such holograms are customarily divided into two categories: amplitude and phase (or dielectric) holograms. The present invention is concerned with volume dielectric holograms, hereinafter referred to as volume dielectric holograms. Such volume holograms are characterized by having emulsion thicknesses that are large compared to the scale of the diffracting structures and the wavelength of light, hence such holograms are often referred to by the term "volume" or "thick" holograms by those skilled in the art of holography. This "volume" permits Bragg selection effects to provide an extra information storage dimension.

A typical known processing procedure for thick bleached holograms consists of exposure and conventional development to produce an average density of about 2.0, then either fixing and washing followed by a rehalogenating bleach (to produce a "negative-working" image), or only washing followed by a silver-solubilizing bleach (to produce a finer grained "positive-working" image). Both processes leave behind imagewise varying concentrations of dielectric deposits (usually as silver bromide grains of about 50 nm. diameter) representing an emulsion volume fraction typically varying between 0 and 18%, and averaging about 6% or 12% (negative or positive, respectively) over the image. These processes introduce serious physical and optical distortions of the final diffracting structure, due to the removal of volume constituents (most of the silver halide) and a lowering of the average refractive index for the same reason. These effects make uniform reconstructions of transmission holograms difficult.

Another problem basic to dielectric volume holograms is that signal terms tend to be multiplicative, rather than simply additive as in absorbing type holograms. The result is that the low-angle scattering that usually appears around the reconstructing illumination beam now appears around every object to produce a diffuse background light level often termed "intermodulation noise". Although this noise would be considerably suppressed by an infinitely thick hologram, the rate of decrease with increasing thickness is quite low, and available silver halide emulsions do not suppress it. The solution in practice is to decrease the ratio of the object to reference beam intensities for exposure until an acceptable ratio of reconstructed image brightness to noise level is reached, at an image brightness far below maximum.

Thus it will be seen that it has been customary in the formation of volume dielectric holograms using silver halide films to selectively remove silver atoms imagewise from the silver halide emulsion, so that the remaining silver atoms, whether as metallic silver grains or as silver salts, represent the stored information.

The present invention is concerned with improved methods and processes for forming volume dielectric holograms.

A primary object of this invention is to provide a novel process of forming volume dielectric holograms wherein the silver atoms are not removed imagewise from the emulsion but are redistributed by intra-emulsion diffusion.

A further object of the present invention is to provide volume dielectric holograms exhibiting reduced image noise, increased diffraction efficiency, and restored thickness and average restrictive index.

Other objects of this invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of this invention, reference should be had to the following detailed description.

As indicated above, the present invention is directed to the provision of volume dielectric holograms by processes which do not remove silver atoms imagewise from the silver halide emulsion but which redistribute the silver atoms within the emulsion. That is, any small area of the hologram, i.e., the exposed and processed silver halide emulsion, would have substantially the same average silver halide molecular content during reconstruction as during the imaging exposure, but instead of being in uniformly distributed microcrystals it would be redistributed over very small distances into grating structures in different microcrystalline dispositions.

This invention provides several methods by which such volume dielectric holograms may be prepared, said methods having in common the transfer of silver atoms within the emulsion by a process of dissolving undeveloped silver halide, and diffusing and precipitating said dissolved silver halide on precipitation sites provided by the development of the exposed silver halide. Besides maintaining the emulsion volume and eliminating surface relief, the resulting volume dielectric holograms exhibit increased diffraction efficiency and decreased intermodulation noise.

In the practice of this invention a holographic silver halide emulsion is exposed in accordance with conventional and well known holographic exposure techniques. The exposed silver halide emulsion is developed to provide an imagewise distribution of grains of metallic silver, using so called "chemical" development. The undeveloped silver halide grains are dissolved with a silver halide solvent to form mobile or diffusible silver complexes, and the thus solubilized silver atoms are diffusion transferred within the silver halide emulsion layer—i.e., intra-emulsion diffusion transfer—in the presence of a reducing species that will precipitate the complexed silver onto the previously developed silver grains which act as catalytic nuclei; this step may be referred to as "solution-physical" development. By appropriately balancing the processing constituents with respect to the silver halide emulsion, substantially or essentially all the silver can be retained within the silver halide emulsion layer. The "chemical" development and the subsequent "solution-physical" development may be effected by employing sequentially applied processing composition or they may be effected by applying a single processing composition.

Following development and intra-emulsion diffusion transfer, the resulting silver image is subjected to a rehalogenating bleach. The final rehalogenated silver image preferably is composed of silver bromide grains.

The following example is given for purposes of illustration only and is not intended to be limiting.

EXAMPLE

A silver bromide emulsion commercially available under the designation Kodak 120-02 Holographic Plate was exposed, using as the test object a transilluminated nondepolarizing diffuser in the shape of a cross about 2½ cm. wide, one-half meter in front of the 120-02 Plate. The reference beam was a point source and one meter away, at an angle of 45°. The value of the thickness geometrical Q-parameter was about ten, indicating thick hologram recording. The exposed film was then developed in Kodak D-19 Developer for 5 minutes. The formula for Kodak Developer D-19, as set forth in *Photo-Lab-Index*, published by Morgan & Morgan, Inc., Hastings-on-Hudson, N. Y., p 3–208 (1971) is:

| Elon (N-methyl-p-aminophenol) | 2.0 g. |
|---|---|
| Sodium sulfite (desiccated) | 90.0 g. |
| Hydroquinone | 8.0 g. |
| Sodium carbonate (monohydrated) | 52.5 g. |
| Potassium bromide | 5.0 g. |
| Water to make 1000 cc. | |

The developed film was then processed for 20 minutes in a "solution-physical" developer prepared by adding sodium thiocyanate to Kodak D-19 Developer in a quantity of 0.25 g. of sodium thiocyanate per liter of the D-19 Developer. The film was then water washed for 10 minutes, and then washed in bromine water saturated with silver bromide until the film cleared, this washing being continued for an additional 5 minutes after clearing. The washed film was then dried with ethanol. The thus processed hologram reconstructed at very nearly 450 over the useful exposure range, confirming a lack of emulsion shrinkage, even though no swelling agent was used.

When the procedure described in the above example was followed using a holographic exposure at a 10:1 ratio, the resulting volume dielectric hologram exhibited a higher diffraction efficiency and much less intermodulation noise than a control hologram exposed in the same manner but processed in the conventional developing, fixing and bleaching procedure. When the beam ratio for the intra-emulsion diffusion transfer processed hologram was reduced to achieve the same diffraction efficiency as the control hologram, the intermodulation noise disappeared completely.

It will be recognized that the developing times may be varied as a function of the processing composition components and concentrations as well as the particular silver halide emulsion. Such variations are within the realm of routine experimentation and optimum values may be determined easily. Other "chemical" developers may be utilized, such as hydroquinone, tetramethyl reductic acid, etc. Furthermore, the "chemical" developer and the "solution-physical" developer may be combined into a single processing composition. In addition, the development may be effected employing a thin layer of a viscous processing composition, using a cover or spreader sheet to confine and help spread the viscous composition; the viscous processing composition may be stripped off the developed negative. (Such thin layer viscous processing techniques are well known in diffusion transfer photography and therefore need not be described in detail here.)

Other rehalogenating techniques may also be used. If, for example, it is desired to have the final rehalogenated image comprise silver chloride, a suitable rehalogenating bath comprises chlorine water saturated with silver chloride, the developed film being washed therein for the time to clear plus five minutes. One may also rehalogenate first to silver chloride and then convert the silver chloride to silver bromide.

The presence in the rehalogenated image of a large amount of residual halide is effective to suppress photolysis.

Although the above discussion of silver atom redistribution has been in terms of dissolving undeveloped silver halide and precipitating the complexed silver atoms on developed silver grains, it will be understood that the desired redistribution may be effected using a bleach which combines an oxidizing agent and anions of soluble silver salts, in order to produce mobile silver ions from the developed silver grains, and a supply of bromide ions to precipitate silver bromide on the undeveloped silver halide grains.

It is recognized that silver halide solvents have been present during development in many photographic applications. Indeed, the Kodak D-19 Developer employed in the above illustrative example contains a quantity of a weak silver halide solvent (sodium sulfite). As far as is known, however, no one has used a silver halide solvent to reconstitute and redistribute the silver content within the emulsion to achieve the improved volume dielectric holograms provided by this invention.

In the example given above, the photosensitive material was a Kodak 120-02 Holographic Plate. The silver halide emulsion employed in such plates is, as are most silver halide emulsions used in forming volume holograms, a Lippmann-type silver halide emulsion. The Kodak 120-02 Holographic Plate silver halide emulsion comprises silver iodobromide (95% bromide). Essentially the same silver halide emulsion is available coated slightly thinner and on Estar polyester film base under the designation "Kodak SO-173". The silver halide emulsion layer may be 5–6 microns thick and contain about 250–350 mg./ft.$^2$ of silver halide as silver. Similar Lippmann-type silver halide emulsions for holographic use are available from Agfa/Gevaert under the designation Scientia 8E75 plates and films; in many instances, the processing times for these materials is shorter with a given processing composition.

In the above example, Kodak D-19 was used as the developer. As an example of another "chemical" developer, mention may be made of:

| Tetramethyl reductic acid | 18 g. |
|---|---|
| Potassium hydroxide | 11.2 g. |
| Water to make 1 liter | |

Kodak 120-02 plates may be developed in this solution for approximately 4 minutes. This formulation may be converted into a "monobath" or single solution for effecting both the "chemical" and the "solution-physical" development steps by adding a silver halide solvent, e.g., about 0.5 g. sodium thiocyanate per liter; the processing time for Kodak 120-02 plates in this solution is about 20 minutes.

As an example of another "solution-physical" developer, mention may be made of:

| | |
|---|---|
| Para-phenylene diamine dihydrochloride | 18 g. |
| Sodium sulfite (anhydrous) | 50 g. |
| Potassium bromide | 1.0 g. |
| Sodium carbonate | 34 g. |
| Sodium thiocyanate | 0.25 g. |
| Water to make 1 liter | |

A typical processing time for Kodak 120-02 plates in this composition is about 30 minutes.

As an example of another "single solution" processing composition, mention may be made of:

| | |
|---|---|
| Sodium sulfite | 60 g. |
| Potassium bromide | 20 g. |
| Hydroquinone | 30 g. |
| Sodium hydroxide | 26 g. |
| Sodium aluminate (NaAlO$_2$) | 8.2 g. |
| Phenidone (1-phenyl-3-pyrazolidone) | 6.0 g. |
| Sodium thiocyanate | 1.5 g. |
| Water to make 1 liter | |

This formulation is effective to "single solution" process Kodak SO-173 or 120-02 Holographic emulsions in about 16 minutes. For use with Agfa/Gevaert Scientia 8E75 film discussed above, it is advantageous to increase the sodium thiocyanate to 6.0 g.

Since certain changes may be made in the above process without departing from the scope of the invention herein involved, it is intended that all matter contained in the above description shall be interpreted as illustrative and not in a limiting sense.

What is claimed is:

1. The method of forming a volume dielectric hologram which comprises developing exposed silver halide grains of holographically exposed silver halide emulsion layer to form therein an imagewise distribution of silver grains, dissolving unexposed silver halide with a silver halide solvent to form a diffusible silver complex, diffusing said diffusible silver complex within said silver halide emulsion layer and precipitating the silver halide thereof on said silver grains in the presence of a reducing species, and rehalogenating the resulting distribution of silver grains, the resulting hologram having substantially the same average silver halide content per unit area as said exposed but undeveloped silver halide emulsion.

2. The method of claim 1 wherein said exposed silver halide grains comprise silver bromide and said rehalogenation is effective to convert metallic silver to silver bromide.

3. The method of claim 1 wherein said silver development and said silver halide dissolution and precipitation are effected by the same processing composition.

4. The method of claim 1 wherein said silver development and said silver halide dissolution and precipitation are effected by separate, sequentially applied processing compositions.

5. The method of claim 1 wherein said silver halide emulsion is a Lippmann-type emulsion.

6. The method of claim 1 including the step of leaving in said hologram a residual quantity of halide effective to suppress photolysis of said rehalogenated silver grains.

7. A volume dielectric hologram consisting essentially of a developed and unfixed silver halide emulsion containing an imagewise distribution of silver halide grains, said imagewise distribution of silver halide grains having been formed by rehalogenation of developed metallic silver grains including silver deposited by intraemulsion diffusion, said hologram containing a quantity of halide effective to suppress photolysis of said silver halide grains.

* * * * *